US008056881B2

(12) United States Patent
Landers et al.

(10) Patent No.: US 8,056,881 B2
(45) Date of Patent: Nov. 15, 2011

(54) ELECTROSTATIC ACTUATION FOR MANAGEMENT OF FLOW IN MICRO-TOTAL ANALYSIS SYSTEMS (μ-TAS) AND RELATED METHOD THEREOF

(75) Inventors: James P. Landers, Charlottesville, VA (US); Matthew R. Begley, Charlottesville, VA (US); Jerome P. Ferrance, Charlottesville, VA (US); Michael H. Jones, Washington, DC (US); Jennifer Monahan-Dian, Lafayette, IN (US)

(73) Assignee: University of Virginia Patent Foundation, Charlottesville, VA (US)

( * ) Notice: Subject to any disclaimer, the term of this patent is extended or adjusted under 35 U.S.C. 154(b) by 887 days.

(21) Appl. No.: 11/665,326

(22) PCT Filed: Oct. 13, 2005

(86) PCT No.: PCT/US2005/036675
§ 371 (c)(1),
(2), (4) Date: Mar. 14, 2008

(87) PCT Pub. No.: WO2006/044458
PCT Pub. Date: Apr. 27, 2006

(65) Prior Publication Data
US 2008/0179555 A1      Jul. 31, 2008

Related U.S. Application Data

(60) Provisional application No. 60/618,127, filed on Oct. 13, 2004.

(51) Int. Cl.
*F16K 31/02*    (2006.01)

(52) U.S. Cl. ............... 251/129.06; 251/57; 251/61.2
(58) Field of Classification Search .............. 251/57, 251/129.01, 129.06, 61, 61.1, 61.2
See application file for complete search history.

(56) References Cited

U.S. PATENT DOCUMENTS

| 5,069,419 | A | | 12/1991 | Jerman |
| 5,785,295 | A | | 7/1998 | Tsai et al. |
| 5,958,349 | A | | 9/1999 | Petersen et al. |
| 6,062,532 | A | * | 5/2000 | Gurich et al. .............. 251/57 |
| 6,126,140 | A | | 10/2000 | Johnson et al. |
| 6,182,941 | B1 | * | 2/2001 | Scheurenbrand et al. ............. 251/129.04 |

(Continued)

FOREIGN PATENT DOCUMENTS

WO   WO-2006044458 A2   4/2006

(Continued)

OTHER PUBLICATIONS

"International Application Serial No. PCT/US2005/036675, International Preliminary Report on Patentability mailed Apr. 17, 2007", 4 pgs.

(Continued)

*Primary Examiner* — John Fristoe, Jr.
(74) *Attorney, Agent, or Firm* — Schwegman, Lundberg & Woessner, P.A.

(57) ABSTRACT

The present invention relates to microfluidic devices, and in particular, flow management in such devices. In particular, the present invention provides an electrostatic valve for flow manipulation in a microfluidic device. The valve of the present invention sits on a valve seat in a microchannel and deflects away from the valve seat by electrostatic actuation to assume an opened configuration to allow fluid flow.

27 Claims, 3 Drawing Sheets

U.S. PATENT DOCUMENTS

| | | |
|---|---|---|
| 6,312,929 B1 | 11/2001 | McMillan |
| 6,368,871 B1 | 4/2002 | Christel et al. |
| 6,369,893 B1 | 4/2002 | Christel et al. |
| 6,374,684 B1 | 4/2002 | Dority |
| 6,403,037 B1 | 6/2002 | Chang et al. |
| 6,431,476 B1 | 8/2002 | Taylor et al. |
| 6,440,725 B1 | 8/2002 | Pourahmadi et al. |
| 6,534,645 B2 | 3/2003 | McMillan |
| 6,565,815 B1 | 5/2003 | Chang et al. |
| 6,660,228 B1 | 12/2003 | Chang et al. |
| 6,664,104 B2 | 12/2003 | Pourahmadi et al. |
| 6,713,297 B2 | 3/2004 | McMillan et al. |
| 6,739,531 B2 | 5/2004 | Taylor |
| 6,783,736 B1 | 8/2004 | Taylor et al. |
| 6,783,934 B1 | 8/2004 | McMillan et al. |
| 6,811,133 B2 * | 11/2004 | Miles .................. 251/57 |
| 6,818,185 B1 | 11/2004 | Petersen et al. |
| 6,819,027 B2 | 11/2004 | Saraf |
| 6,837,476 B2 * | 1/2005 | Cabuz et al. .......... 251/129.01 |
| 6,878,540 B2 | 4/2005 | Pourahmadi et al. |
| 6,881,541 B2 | 4/2005 | Petersen et al. |
| 6,887,693 B2 | 5/2005 | Mcmillan et al. |
| 6,893,879 B2 | 5/2005 | Petersen et al. |
| 6,911,327 B2 | 6/2005 | Mcmillan et al. |
| 6,940,598 B2 | 9/2005 | Christel et al. |
| 6,942,971 B2 | 9/2005 | McMillan et al. |
| 6,953,058 B2 * | 10/2005 | Fernandes et al. ......... 137/832 |
| 6,979,424 B2 | 12/2005 | Northrup et al. |
| 6,987,018 B2 | 1/2006 | Taylor et al. |
| 7,101,509 B2 | 9/2006 | Chang et al. |
| 7,135,144 B2 | 11/2006 | Christel et al. |
| 7,188,001 B2 | 3/2007 | Young et al. |
| 7,226,732 B2 | 6/2007 | Sakai et al. |
| 7,255,833 B2 | 8/2007 | Chang et al. |
| 7,294,466 B2 | 11/2007 | McMillan |
| 7,410,760 B2 | 8/2008 | Swenson |
| 7,462,323 B1 | 12/2008 | Chang et al. |
| 7,569,346 B2 | 8/2009 | Petersen |
| 7,575,721 B2 | 8/2009 | Chang et al. |
| 7,621,418 B2 | 11/2009 | Chang |
| 7,687,232 B2 | 3/2010 | Gyllensten et al. |
| 7,803,549 B2 | 9/2010 | Swenson |
| 7,914,994 B2 | 3/2011 | Petersen et al. |
| 2001/0012612 A1 | 8/2001 | Petersen et al. |
| 2001/0019114 A1 | 9/2001 | Arakawa et al. |
| 2002/0019060 A1 | 2/2002 | Petersen et al. |
| 2002/0025576 A1 | 2/2002 | Northrup et al. |
| 2002/0031768 A1 | 3/2002 | McMillan et al. |
| 2002/0034745 A1 | 3/2002 | McMillan et al. |
| 2002/0034746 A1 | 3/2002 | McMillan et al. |
| 2002/0039783 A1 | 4/2002 | McMillan et al. |
| 2002/0042125 A1 | 4/2002 | Petersen et al. |
| 2002/0045246 A1 | 4/2002 | McMillan et al. |
| 2002/0055167 A1 | 5/2002 | Pourahmadi et al. |
| 2002/0058282 A1 | 5/2002 | McMillan |
| 2002/0109844 A1 | 8/2002 | Christel et al. |
| 2002/0168299 A1 | 11/2002 | Chang et al. |
| 2002/0175079 A1 | 11/2002 | Christel et al. |
| 2002/0187547 A1 | 12/2002 | Taylor et al. |
| 2003/0066915 A1 | 4/2003 | Taylor |
| 2003/0152492 A1 | 8/2003 | Chang et al. |
| 2003/0162304 A1 | 8/2003 | Dority et al. |
| 2003/0164658 A1 | 9/2003 | Saraf |
| 2003/0221771 A1 | 12/2003 | Chang et al. |
| 2004/0096819 A1 | 5/2004 | McMillan |
| 2004/0101859 A1 | 5/2004 | Moon |
| 2004/0122559 A1 | 6/2004 | Young et al. |
| 2004/0166031 A1 | 8/2004 | Taylor et al. |
| 2004/0200909 A1 | 10/2004 | McMillan et al. |
| 2005/0003374 A1 | 1/2005 | Swenson |
| 2005/0042137 A1 | 2/2005 | Petersen et al. |
| 2005/0069898 A1 | 3/2005 | Moon et al. |
| 2005/0095603 A1 | 5/2005 | Mokkapati et al. |
| 2005/0194316 A1 | 9/2005 | Pourahmadi et al. |
| 2005/0244837 A1 | 11/2005 | McMillan et al. |
| 2005/0255516 A1 | 11/2005 | McMillan et al. |
| 2006/0014200 A1 | 1/2006 | McMillan |
| 2006/0019379 A1 | 1/2006 | Taylor et al. |
| 2006/0027686 A1 | 2/2006 | Taylor et al. |
| 2006/0068398 A1 | 3/2006 | McMillan |
| 2006/0068399 A1 | 3/2006 | McMillan et al. |
| 2006/0169708 A1 | 8/2006 | Chang |
| 2006/0177844 A1 | 8/2006 | Ching et al. |
| 2006/0229441 A1 | 10/2006 | Gall |
| 2006/0275178 A1 | 12/2006 | Chang et al. |
| 2007/0259362 A1 | 11/2007 | Sakai et al. |
| 2008/0014114 A1 | 1/2008 | Van Atta et al. |
| 2008/0038737 A1 | 2/2008 | Smith et al. |
| 2008/0057572 A1 | 3/2008 | Petersen et al. |
| 2008/0193946 A1 | 8/2008 | McMillan |
| 2008/0227090 A1 | 9/2008 | Sakai et al. |
| 2008/0254532 A1 | 10/2008 | Chang et al. |
| 2008/0286151 A1 | 11/2008 | Chang et al. |
| 2008/0286798 A1 | 11/2008 | Swenson |
| 2009/0047669 A1 | 2/2009 | Zhang et al. |
| 2009/0062135 A1 | 3/2009 | Delfour et al. |
| 2009/0308886 A1 | 12/2009 | Chang et al. |
| 2010/0068706 A1 | 3/2010 | Pourahmadi et al. |
| 2010/0129827 A1 | 5/2010 | Mcmillan |
| 2010/0136569 A1 | 6/2010 | Moon et al. |
| 2010/0233704 A1 | 9/2010 | Michot et al. |
| 2010/0240049 A1 | 9/2010 | Svanholm Barrie et al. |
| 2011/0053155 A1 | 3/2011 | Gall |

FOREIGN PATENT DOCUMENTS

| | | | |
|---|---|---|---|
| WO | WO-2006044458 A3 | 4/2006 | |

OTHER PUBLICATIONS

"International Application Serial No. PCT/US2005/036675, Written Opinion mailed Apr. 10, 2006", 3 pgs.

\* cited by examiner

ELECTROSTATIC ACTUATION FOR MANAGEMENT OF FLOW IN MICRO-TOTAL ANALYSIS SYSTEMS (μ-TAS) AND RELATED METHOD THEREOF

RELATED METHOD THEREOF

This application claims the priority of U.S. Provisional Patent Application Ser. No. 60/618,127, filed Oct. 13, 2004, the disclosure of which is incorporated herein by reference.

FIELD OF THE INVENTION

The present invention relates to microfluidic devices, and in particular, flow management in such devices.

BACKGROUND OF THE INVENTION

Miniaturization of analytical methodology onto microdevices has seen a surge of research interest over the recent decade due to the possibilities of reduced reagent and sample volumes, reduced analysis times, and parallel processing. Another leading advantage of miniaturization is the potential to integrate multiple sample handling steps with analysis steps to achieve integrated, user-friendly, sample-in/answer-out devices—commonly referred to as micro-total-analysis systems (μ-TAS). Many of these emerging μ-TAS can simply be interfaced with a computer for automated, user-friendly applications.

Microfluidic devices are known. For example, U.S. Pat. Nos. 6,130,098 to Handique; 6,919,046 to O'Connor et al.; 6,544,734 to Briscoe et al.; the disclosures of which are incorporated herein by reference, discloses microfluidic devices for use in biological and/or chemical analysis. The system includes a variety of microscale components for processing fluids, including reaction chambers, electrophoresis modules, microchannels, detectors, valves, and mixers. Typically, these elements are microfabricated from silicon, glass, ceramic, polymer, metal, and/or quartz substrates. The various fluid-processing components are linked by microchannels, through which the fluid flows under the control of a fluid propulsion mechanism. If the substrate is formed from silicon, electronic components may be fabricated on the same substrate, allowing sensors and controlling circuitry to be incorporated in the same device. These components can be made using conventional photolithographic techniques, as well as with laser ablation, polymer molding, hot embossing, micromachining, physical/mechanical removal, or similar methods. Multi-component devices can be readily assembled into complex, integrated systems. In most microfluidic research laboratories, photolithography and chemical etching are used in their simplest form to create patterns in a monolithic configuration.

A large breadth of biological and/or chemical analyses is possible with microdevices having multifunction capabilities. The key to creating multifunctional devices with turn-key operation capability will be the integration of processes for total analysis. For example, for genomic analysis, the totally integrated analysis would require that steps such as cell lysis, DNA extraction, DNA purification, and DNA amplification (via PCR) be carried out on-chip prior to electrophoresis on the same microdevice. This promises to provide investigators with a powerful technology that will minimize sample and operator contamination, as well as reduce the potential for concomitant error often induced by sample transfer and the interchange between devices. Other advantages include circumventing the need for large sample volumes (many systems require only nanoliter volumes) and increasing reaction rates (Manz et al. *Adv. Chromatogr.* 1993, 33:61).

One of the important issues for proper function of a μ-TAS is the control of fluid flow through the microfluidic network of the device. Each compartment or microscale component of the device is connected to another through a microchannel that facilitates the transfer of sample from one location in the microdevice to the next. Moreover, while the various functionalities on the chip are connected by their inherent dependency on one another, they are, nonetheless, independent units carrying out very different chemistries. In fact, the reagents used/contained in any functional domain are often harmful to the processes carried out in other domains. For example, isopropanol and guanidine are critical for the extraction of DNA from cell lysates; however, leakage of either reagents into a PCR domain (one possible pathway in the sample preparation sequence) is fatal to the amplification process (inhibits PCR). As a result, keeping the various domains connected but chemically isolated is a necessity. In more complicated microdevices, this is accomplished with a system of 'pumps' and 'valves' to control and direct flow from one compartment to the next.

The mechanisms of valve actuation are manifold. Some rely on pneumatic mechanism while others depend upon mechanical pressure or piezoelectric methods. Many systems rely on a flexible, elastomer valve (Unger et al. *Science* 2000, 288:113; Grover et al. *Sens. Actuators B* 2003, 89:315) that can be easily manipulated so as to allow on-command distension, while others have utilized pH-sensitive (Yu et al. *Phys. Lett.* 2001, 78:2589) or thermo-reactive polymers (Harmon et al. *Polymer* 2003, 44:4547; Yu et al. *Anal. Chem.* 2003, 75:1958). Olefins (Klintberg et al., *Sens. Actuators A* 2003, 103:307; Selvaganapathy et al. *Sens. Actuators A* 2003, 104:275), ferro-fluid (Hatch et al. *J. Microelectromechan. Syst.* 2001, 10:215), and air bubbles (Song et al. *J. Micromech. Microeng.* 2001, 11:713; Handique et al. *Anal. Chem.* 2001, 73:1831; U.S. Pat. No. 6,877,528 to Gilbert et al.) have also been used for valving. Additionally, a number of mechanisms exist for generating flow through the microchannels. The method of Unger et al. starts with all valves in the open position, and then, in a stepwise fashion, each valve closes in series (via pressure actuation) to create a peristaltic pump. Another method by Grover et al. functions similarly to a diaphragm. All valves start in the closed position and flow is accomplished by successive opening (via pneumatic mechanisms) of valves in a determined pattern. Both the Unger et al. and Grover et al. methods use solenoid valves coupled directly into the channel wall and require a separate pump to operate.

Other prior art valves for use in microfluidic devices include U.S. Pat. Nos. 6,901,949 and 6,817,373 to Cox et al.; 6,802,489 to Marr et al.; 6,783,992 to Robotti et al.; 6,748,975 to Hartshorne et al.; 6,698,454 to Sjolander et al.; 6,615,856 to McNeely et al.; 6,581,899 to Williams; 6,561,224 to Cho; 6,431,212 to Hayenga et al.; and 6,382,254 to Yang et al.; the disclosures of which are incorporated herein by reference.

As with most methods used for directing flow through a microchannel network, the prior art valves are not without limitations, which include inefficient flow control, large power requirements, slow response speed, size, portability challenge and restrictions associated with the chemical characteristics of the elastomer as it pertains to the application. Consequently, there is a critical need to develop totally integrated microfluidic devices with valving capabilities that not only meet the needs of the application in a cost-effective manner, but also allow for simple, smooth, and precise control of flow through the microchannel architecture.

SUMMARY OF THE INVENTION

An object of the present invention is to provide an electrostatic valve for flow manipulation in a microfluidic device. Specifically, it relates to management of fluid flow in micro total analysis systems through the use of an elastomer valve. An advantage of some of the embodiments of the current invention is the ability to control flow using mechanisms specific to flow control, which are independent of the fluidic network. Other advantages include improved portability, greater control of flow rates, increased response speed, reduced device size, and smaller power requirements. Some of the embodiments of the current invention also allow the use of any type of elastomer valve to manipulate flow through a microchannel.

In one aspect of the present invention, the valve contains a valve film coated with a conductive material overlaying a valve seat on a microfluidic substrate having at least a microscale component therein. Above the coated film and the valve seat is an electrode separated from the coated film by a gap. When the coated film is seated directly on top of the valve seat, fluid flow across the valve seat is prevented. However, when an electrical potential is applied between the electrode and the conductive coating of the film, attraction between the film and electrode causes the film to lift away from the valve seat, allowing for fluid to flow across the valve seat in the space between the film and the valve seat.

In another aspect of the present invention, the valve contains a first film overlaying a valve seat on a microfluidic substrate having at least a microscale component therein. The first (valve) film, on the side facing away from the microfluidic substrate, is fluidly connected with and is fluidly connected to a fluid reservoir containing a fluid. "Fluidly connected" as used herein refers to a condition wherein two elements are connected to each other by or in contact with the same continuous body of fluid. The fluid reservoir is covered by a second (actuator) film coated with a conductive material. Above the second film sits an electrode separated from the coated film by a gap. Because the second film is physically removed from the first film, the physical parameters controlling electrostatic actuation can be adjusted independently of the flow requirements of the channel. In this manner, the relative motion of both films can be different, such that one can achieve large valve motion in the first (valve) film with small displacements of the second (actuator) film.

To achieve this amplification of actuator displacement, the area of the reservoir that is fluidly connected with the second film must be greater than the area of the reservoir that is in fluid contact with the first film. When an electrical potential is applied between the electrode and the conductive coating of the film, attraction between the second film and electrode causes the second film to lift away from the fluid reservoir, which causes the first film to lift a way from the valve seat, because the fluid reservoir is full of fluid and both first and second films are in fluid contact with each other. In this configuration, a small amplitude of deflection of the second film, upon application of an electrical potential between the second film and the electrode, causes a greater amplitude of deflection in the film seated on the valve seat, allowing a larger fluid path between the film and the valve seat.

Another object of the present invention is to provide methods of making a microfluidic device containing the electrostatic valve of the present invention.

Yet another object of the present invention is to provide methods of conducting biological and/or chemical analysis in an integrated microfluidic device using the electrostatic valve of the present invention.

Electrostatic actuation for management of flow in micro total analysis systems can be performed for all steps in any biological and/or chemical analysis known to exist. These include, but are not limited to, genetic assays, DNA sequencing, protein detection, chromatography, PCR, high throughput screening, and the like.

An advantage of some of the embodiments of the current invention is the ability to control flow independent of the fluidic network. Other advantages include improved portability, greater control of flow rates, increased response speed, reduced device size, and smaller power requirements. Some of the embodiments of the current invention can be fabricated with a wide range of polymeric materials (including those than can be spin-coated from solution). A novel concept is, among other things, the generation of large actuator displacements (on the scale of tens of microns) using an independent electrostatic gap that can be much smaller, significantly reducing actuation voltages. The novel approach combines microfluidic reservoirs and electrostatic actuation, and is applicable to any micro-device where large displacements are required. A feature of the design is to choose actuator dimensions independently from the component being deformed, which greatly broadens the range of moveable component dimensions and performance.

DETAILED DESCRIPTION OF THE PREFERRED EMBODIMENT

Microfluidic devices typically include micromachined fluid networks. Fluid samples and reagents are brought into the device through entry ports and transported through channels to a reaction chamber, such as a thermally controlled reactor where mixing and reactions (e.g., synthesis, labeling, energy-producing reactions, assays, separations, or biochemical reactions) occur. The biochemical products may then be moved, for example, to an analysis module, where data is collected by a detector and transmitted to a recording instrument. The fluidic and electronic components are preferably designed to be fully compatible in function and construction with the reactions and reagents.

There are many formats, materials, and size scales for constructing microfluidic devices. Common microfluidic devices are disclosed in U.S. Pat. Nos. 6,692,700 to Handique et al.: U.S. Pat. No. 6,919,046 to O'Connor et al.; 6,551,841 to Wilding et al.; 6,630,353 to Parce et al.; 6,620,625 to Wolk et al.; and 6,517,234 to Kopf-Sill et al.; the disclosures of which are incorporated herein by reference. Typically, a microfluidic device is made up of two or more substrates that are bonded together. Microscale components for processing fluids are disposed on a surface of one or more of the substrates. These microscale components include, but are not limited to, reaction chambers, electrophoresis modules, microchannels, fluid reservoirs, detectors, valves, or mixers. When the substrates are bonded together, the microscale components are enclosed and sandwiched between the substrates. In many embodiments, inlet and outlet ports are engineered into the device for introduction and removal of fluid from the system. The microscale components can be linked together to form a fluid network for chemical and/or biological analysis. Those skilled in the art will recognize that substrates composed of silicon, glass, ceramics, polymers, metals, and/or quartz are all acceptable in the context of the present invention. Further, the design and construction of the microfluidic network vary depending on the analysis being performed and are within the ability of those skilled in the art.

Figure 1:
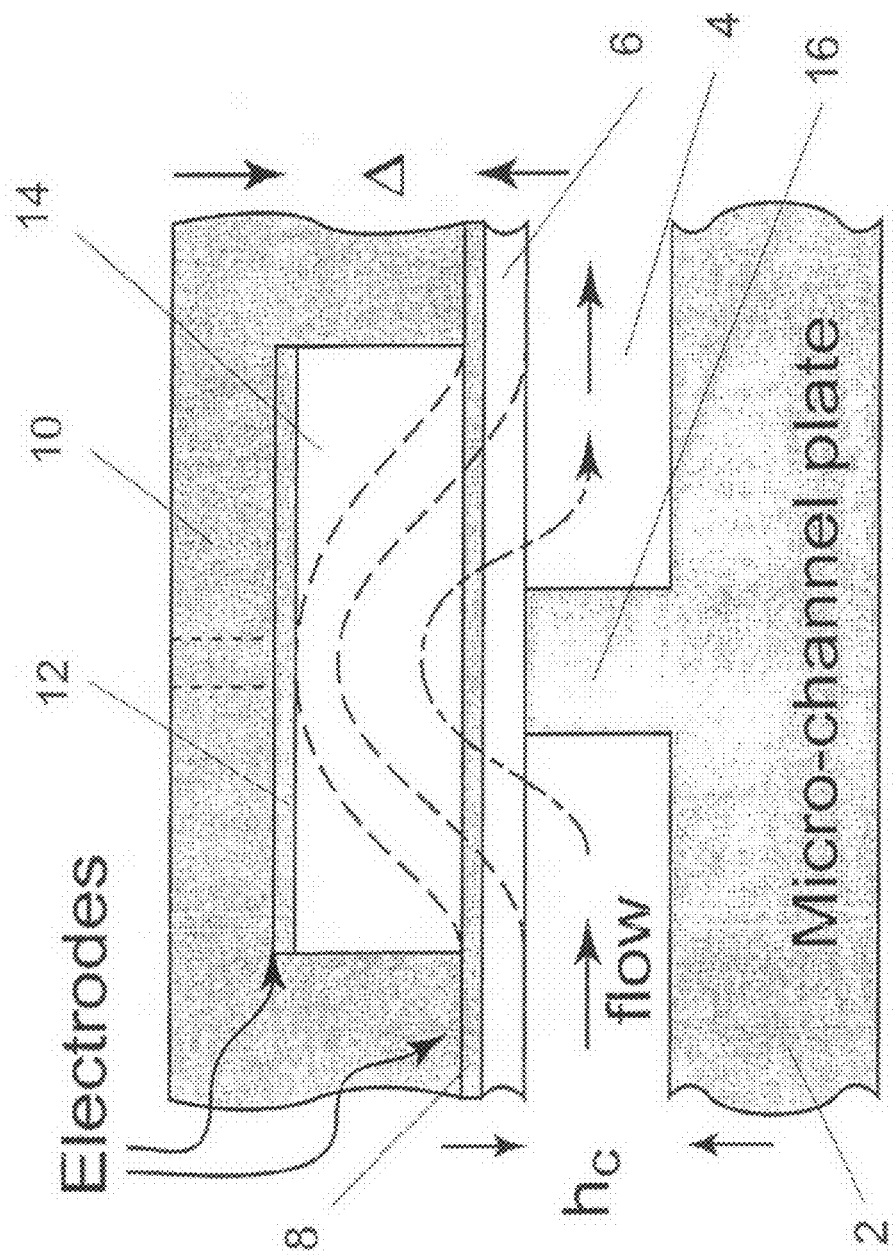
FIG. 1 is a diagram showing the electrostatic valve design of the first embodiment of the present invention.

A first embodiment of the present invention is depicted in FIG. 1. A first substrate 2 contains a microchannel 4, having a fluid flowing in the direction of the arrow. The flow is controlled by a valve containing a film 6 coated with an electrically conductive layer 8, and a valve seat 16. The valve seat 16 is constructed such that when the film 6 sits directly on the valve seat 16, fluid flow across the valve seat is prevent, but when the film 6 is lifted from the valve seat 16, fluid can flow over the valve seat 16 in the space between the valve seat 16 and the film 6. Above the film is a second substrate 10 having a fixed electrode 12 and a gap 14 dispose therein. The second substrate 10 is directly above the film 6, such that the conductive coating 8 of the film 6 is separated from the electrode 12 by the gap 14 and locates directly below the gap. When the film 6 sits directly on top of the valve seat 16, flow across the valve seat 16 is inhibited. This position is referred to as the closed position. When an electrical potential is applied between the conductive coating 8 and the electrode 12, electrostatic attraction between the conductive coating 8 and electrode 12 causes the film to lift away from the valve seat 16 (the lifting of the valve from the valve seat 16 is depicted as dashed lines in FIG. 1), which allows fluid to flow across the valve seat through the opening between the valve seat 16 and the film 6 (the direction of fluid flow is depicted in FIG. 1 as dashed arrow). The position in which the valve lifts away from the valve seat is referred to herein as the opened position.

Although FIG. 1 depicts the valve seat 16 below the valve film 6, one skilled in the art would understand that the position could easily be reversed where the film is below the valve seat. In this position, the opened position results from deflection of the film downward rather than upward. This configuration is essentially FIG. 1 turned upside down.

Moreover, one skilled in the art would understand that deflection of the film could result in closing rather than opening of the valve; and such design would be apparent to one skilled in the art. For example, one can envision a configuration where the valve seat and coated film is located above the microchannel and the electrode is on the bottom of the microchannel such that when actuated, the membrane deflects toward the bottom of the microchannel to shut off flow in the channel. In this configuration, actuation results in closing rather than opening of the channel.

In order to allow for significant flow rates, the valve displacement (into the electrostatic gap 14) must scale with the microchannel 4 dimensions. For devices with typical channel heights on the order of 100 μm, the required electrostatic gap size, Δ, is even larger than the desired valve displacement. Since the operating voltage scales with $1/\Delta^2 \approx 1/h_c^2$ (where $h_c$ is the channel height), film deflection on the order of 10 μm and valve films with thickness on the order of 100 μm translate into operating voltages in the kV range, which creates many difficulties.

Figure 2:
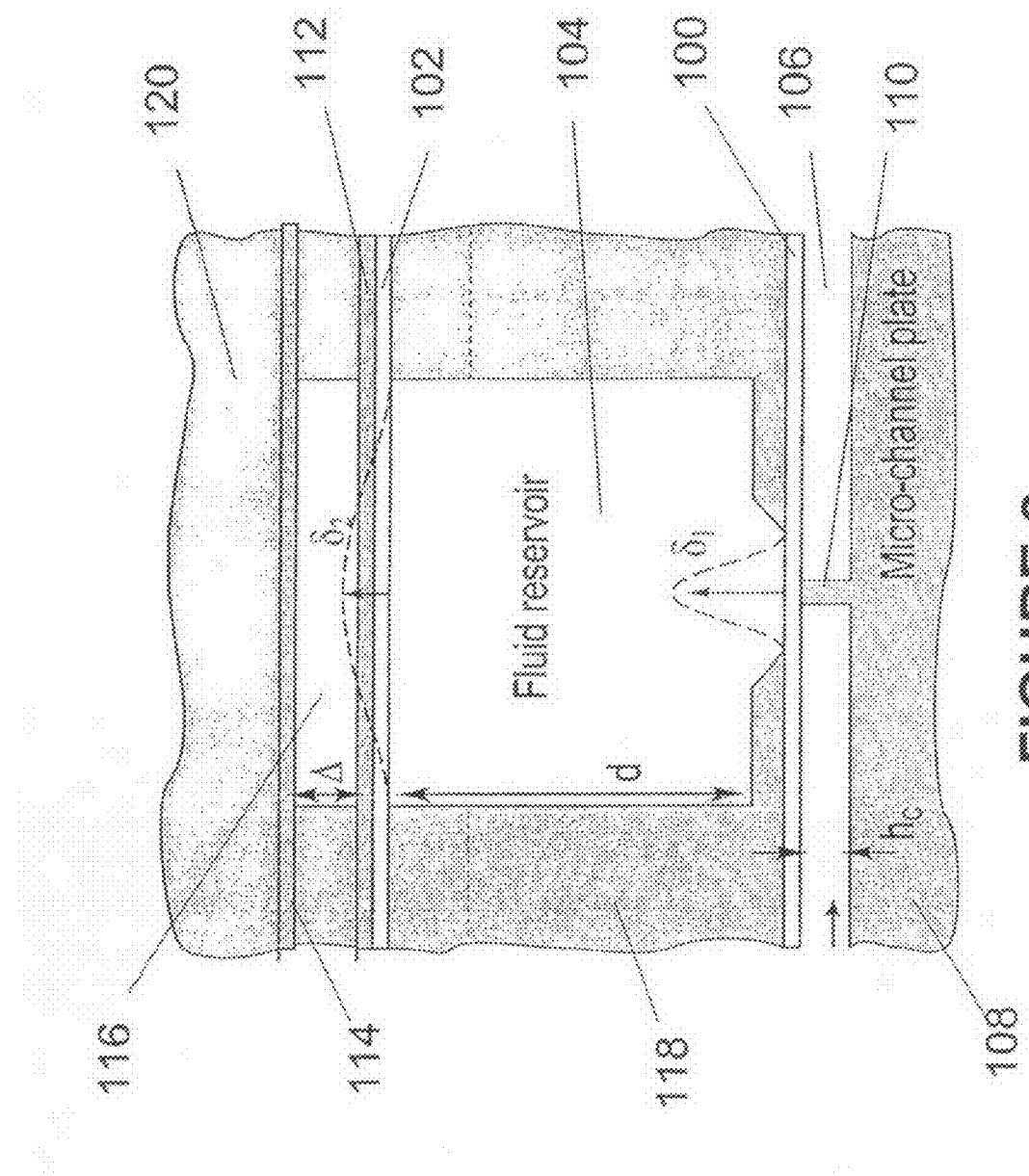
FIG. 2 is a diagram showing the electrostatic valve design of the second embodiment of the present invention.

In a second embodiment, the present inventors have overcome these difficulties by providing an integrated electrostatic microfluidic actuator wherein an isolated fluid reservoir couples the input and output displacements of the valve. The underlying concept behind the approach is illustrated in FIG. 2. In this embodiment, there are two films, a first (valve) film 100 directly seated on the valve and a second (actuator) film 102 covering a fluid reservoir 104. The first film 100 sits on top of a microchannel 106 of a first substrate 108. The microchannel has a valve seat 110 therein to control fluid flow. The top side (the side not in contact with the valve seat) of the first film 100 that is directly above the valve seat 100 is in fluid contact with the fluid reservoir 104. The top of the fluid reservoir 14 is covered with the second film 102 that is coated with a conductive material 112. The conductive material is separated from a fixed electrode 114 by a gap 116 with a separation distance Δ. The top surface of the fluid reservoir 104 that is covered by the second film 102 must be larger to amplify the displacements of the valve film 100; that is, if the span of the actuator film 102 is larger than the span of the valve 100, the displacement of the valve 100 will be greater than that of the actuator film 102. The ratio between actuator film displacement and that of the valve film scales with the square of the ratio of their spans; that is, if the actuator span 102 is ten times larger than the span of the valve, the displacement of the valve 100 will be one hundred times larger than the actuator film displacement. For most microfluidic valve applications, this implies that the actuator film should be 5-100 times larger than the valve film, such that relative small actuator displacements yield large output (valve displacement).

The fluid reservoir is filled with a fluid such that the first and second films 102 and 100 are fluidly connected. When a electrical potential is actuated between the conductive coating 112 and the fixed electrode 114, electrostatic attraction between the conductive coating 112 and the fixed electrode 114 causes the film to deflect away from the top of the fluid reservoir 104 toward the fixed electrode 114 (see dashed line) by a distance $\delta_2$. Because the fluid reservoir 104 is filled with the fluid and the two films 100 and 102 are in fluid contact, the first film 100 also deflects away from the valve seat 110, by a distance $\delta_1$, to allow flow across the valve seat 110 in the space between the first film 100 and the valve seat 110. In this embodiment, because the top surface of the fluid reservoir 104 that is covered by the second film 102 is larger than the area of the fluid reservoir that is fluidly connected to the first film 100, the fluid reservoir transmits the actuation pressure generated over a relatively large area to an output film (the first film 100) that is much smaller. The electrostatic gap 116 is placed outside the fluid chamber, and is thus decoupled from the height of the microchannel 106. The volume displaced by the small actuator displacement ($\delta_2$) over a large area is accommodated by large displacement ($\delta_1$) of the output valve over a small area.

Although FIG. 2 shows the fluid reservoir 104 directly above the first film 100, this needs not be so. The first film 100 needs only be fluidly connected with the fluid reservoir 104 and the second film (102). This can also be accomplished, for example, through a microchannel that connects the first film 100 to the fluid reservoir 104. In this case, the fluid reservoir 104, however, needs not be in the vicinity of the first film 100. It is important, however, that the films 100 and 102 are fluidly connected, which means that the fluid reservoir 104 and the channel connecting the fluid reservoir 104 to the first film must be filled with the fluid. If a fluid is used in the reservoir chamber, the fluid reservoir does not need to be adjacent to the valve film, because fluidic pressure will be transmitted through any connected microchannel system. This is an important advantage of the present embodiment, because it provides an approach to physically separate the actuator film and the valve, i.e. the actuator film can be placed in a different location than the valve, as long as they are fluidly connected.

Figure 3:
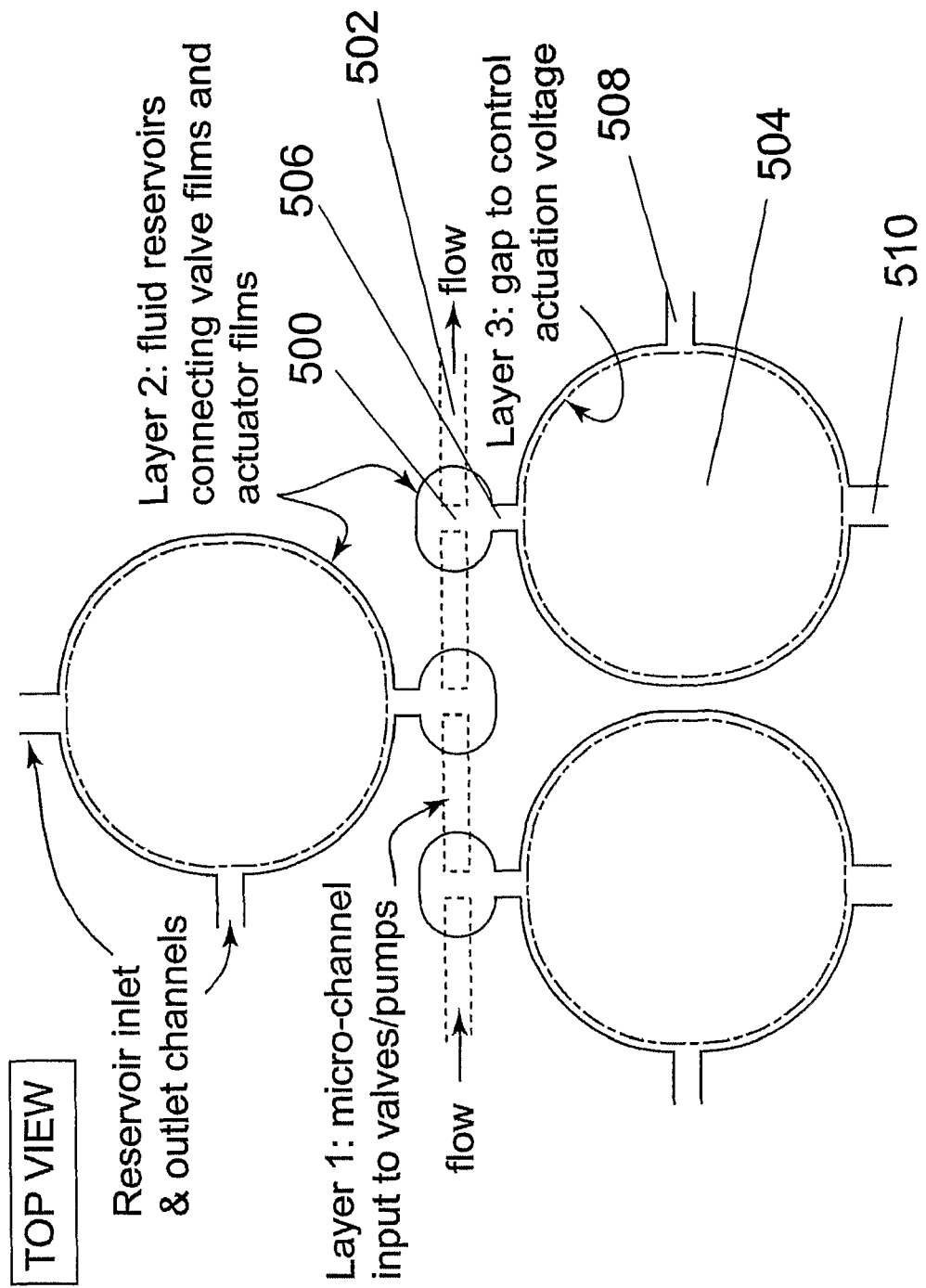
FIG. 3 is a top view showing multiple valves each connected to a fluid reservoir by a channel.

A series of valves can be placed on a microfluidic device for controlling the flow of fluid with in a microchannel or between microscale components of a microfluidic device. An example of this is shown in FIG. 3, which shows a top view of three valves 500 along a microchannel 502 for control fluid flow. The valves can be controlled independently by having each valve being associated with a separate fixed electrode. Further, the fluid reservoirs 504 are not directly on top of the valve, but are fluidly connected to its corresponding valve by a channel 506. Preferably, the reservoirs also have inlet and outlet channels 508 and 510, respectively, for filling and withdrawing fluids from the reservoirs.

The film of the present invention is preferably an elastomeric polymer similar to the elastomeric valves disclosed in U.S. Patent Application Publication Nos. 2005/0166980 and 2002/0109114, the disclosures of which are incorporated herein by reference. In general, elastomers deform when force is applied, but then return to their original shape when the force is removed. The elasticity exhibited by elastomeric materials may be characterized by a Young's modulus. Elastomeric materials having a Young's modulus of between about 10 kPa-10 GPa, preferably between about 100 kPa-500 MPa, more preferably between about 300 kPa-100 MPa, and most preferably between about 500 kPa-10 MPa are appropriate for the present invention, although elastomeric materials having a Young's modulus outside of these ranges could also be utilized depending upon the needs of a particular application. Many types of elastomeric polymers can be useful in for the valve of the present invention, which include, but are not limited to, polyisoprene, polybutadiene, polychloroprene, polyisobutylene, poly(styrene-butadiene-styrene), the polyurethanes, and silicone polymers; or poly(bis(fluoroalkoxy)phosphazene) (PNF, Eypel-F), poly(carborane-siloxanes) (Dexsil), poly(acrylonitrile-butadiene) (nitrile rubber), poly(1-butene), poly(chlorotrifluoroethylene-vinylidene fluoride) copolymers (Kel-F), poly(ethyl vinyl ether), poly (vinylidene fluoride), poly(vinylidene fluoride-hexafluoropropylene)copolymer (Viton), elastomeric compositions of polyvinylchloride (PVC), polysulfone, polycarbonate, polymethylmethacrylate (PMMA), polytetrafluoroethylene (Teflon), polydimethylsiloxane (PDMS), and blends thereof.

The fluid used to fluidly connect the two films can be any fluid, preferably a substantially incompressible fluid; however, the viscosity (and elasticity, if any) of the fluid is important in transmitting the input displacement of the second film to the valve. The speed of transmission depends on the distance between the fluid reservoir and the valve and the viscosity of the fluid. The longer the distance between the fluid reservoir and the valve, the lower the viscosity of the fluid required to maintain the same transmission speed. Thus, if the fluid reservoir is directly on top of the valve as shown in FIG. 2, then the fluid can be more viscous. On the other hand, if the fluid reservoir is further from the valve, e.g. as shown in FIG. 3, then a lower viscosity fluid is required. Generally, the dynamic viscosity of the fluid is preferably about 0.0001-2 Ns/m$^2$, more preferably about 0.001-0.01 Ns/m$^2$, and most preferably about 0.0001-0.001 Ns/m$^2$.

It must be noted, however, that the ability to transmit pressures via a viscous (or viscoelastic) substance is governed by the shear transfer that occurs between the side walls and the fluid in the channel, which is influenced by both the viscosity and any elastic response of the material, as well as the dimensions of the reservoir. If the substance is a true fluid (such that it cannot support any static shear stress, i.e. the elastic response is negligible—such as water or completely uncrosslinked polymers), then the viscosity of the fluid merely will affect the time response. However, if the fluid has an elastic component (such as occurs in partially cross-linked polymers), then shear transfer implies that compressive stresses build in the channel and limit output. Therefore, substances with partially elastic response, such as cross-linked polymers or gels, are highly undesirable for the present invention. The following fluids are appropriate for the present invention (depending on the choice of the valve/actuator films which seal the chamber): aqueous/organic liquids, aqueous solutions containing uncross-linked polymers, and any other immiscible fluids (including oils). Aqueous solutions preferably are those functioning as physiological buffers, high ionic strength solutions, including chaotropes, and containing uncross-linked polymers. Organic liquids are preferably alcohols, such as isopropanol, methanols, ethanols, and synthetic organic fluids, such as hexanes, dimethyl formamide, and dimethyl sulfoxide.

Most conductive coatings are appropriate for the present invention. It is most desirable that the conductive coating is compatible with the film and does not affect its elastomeric properties. Preferred conductive coatings are, but are not limited to, metals (such as aluminum, copper, gold, or chromium), and conductive polymers (such as polypyrrole, polyaniline, or poly-divinyl fluoride). It is not important that the conductive film covers the entire surface area of the valve film. As such, micro-patterned grids, lines, zig-zags, etc. of conductive material will allow for device function, and may be preferred in some applications where large actuator film compliance is desired.

The construction of the present invention can be made using currently available techniques, such as etching, laser ablation, polymer molding, hot embossing, micromachining, etc. Preferably, the devices are made by the bonding of at least two substrates. For example, the first embodiment (FIG. 1) is preferably made from two substrates: a first substrate 2 having microfluidic channels 4, valve seats 16, and a coated films 6 disposed thereon; and a second substrate 10 having fixed electrodes 12 and gaps 14 disposed thereon. The microfluidic device is formed when the two substrates are bonded together forming a microfluidic network having electrostatic valves for controlling the flow of liquid.

The second embodiment (FIG. 2) is preferably made with substrates: a first substrate 108 having microfluidic channels 106, valve seats 110, and first (valve) films 100 disposed thereon; a second substrate 118 having fluid reservoirs 104, channels connecting the fluid reservoirs to the valve, and second (coated) film disposed thereon; and a third substrate 120 having fixed electrodes 114 and gaps 116 disposed thereon. The microfluidic device of FIG. 2 is formed when the three substrates are bonded together forming a microfluidic network having electrostatic valves for controlling the flow of liquid.

The second embodiments of the invention can be assembled according to the following plan:

The device is divided into two parts: a fluid reservoir and an electrostatic actuated freestanding span (the valve). These parts are then mechanically assembled to create a high displacement valve with relatively low operating voltages.

The fluid reservoir consists of three layers fabricated through successive applications of SU-8 (photoresist) with selective exposure and a single development. The first layer's purpose is to set the radius of the lower span (the valve). The first layer is constructed on an SU-8 release layer so that the entire device can be removed from the substrate and integrated into another system. The thickness of this layer can either be increased to offer great rigidity for mechanical assembly or reduced to minimize reservoir volume (~50 µm). The second layer has two microchannels used to transport fluid into the reservoir. The third layer provides the upper wall to the micro-channels as well as surface access to the channels. The main chamber of the reservoir is shared between the second and third layers and the radius of the upper actuating span sets its dimensions. The second layer must be thick (~75 µm) due to the fact that some of the some of the uncured SU-8 in the channels will harden with the application and exposure of the third SU-8 layer. Previous experiments have shown that approximately 25 µm will become cured, reducing the channel depth to 50 µm. This should allow for adequate flow when filling the chamber. The third layer is approximately 10 µm thick. Increasing its thickness would require longer exposure times that may reduce the height of the channels. This gives the fluid reservoir a total thickness of approximately 135 µm, which is suitable for mechanical assembly. After all three layers have been patterned the reservoir is developed in an ultrasonic bath of PGMEA to remove the uncured SU-8 in the channels and reservoir chamber.

The electrostatic portion of the device consists of a base electrode and a freestanding PDMS film suspended on an SU-8 platform. First, the electrode is deposited on to a substrate (preferably glass to ease alignment). This is accomplished by spinning and patterning a thick layer of photo resist and then depositing a layer of Cr/Au (50 nm/50 nm). The photo resist is then removed in an acetone ultra-sonic bath leaving the desired gold pattern. An SU-8 layer is then spun on and patterned but not developed. This creates a hard platform for the actuator span to rest on and also leaves a sacrificial layer of uncured SU-8 on which to spin a thin layer of PDMS (~10 um). After the PDMS layer is spun on the uncured SU-8 is removed via channels through the platform creating a freestanding film. An electrode is then patterned onto the film using the same lift-off process described above. An alternative to this method would be to pattern the base electrode and SU-8 platform then mechanically adhere the PDMS film. However, this limits the span thickness that can be used due to the difficulty of handling and aligning thin polymer films.

After both components are finished the electrostatic device is inverted and adhered to the fluid reservoir. The reservoir substrate is then removed leaving an opening at the base. This entire device can then be filled with fluid and adhered to the film to be actuated.

The systems described herein generally include microfluidic devices, as described above, in conjunction with additional instrumentation for controlling fluid transport, flow rate and direction within the devices, detection instrumentation for detecting or sensing results of the operations performed by the system, processors, e.g., computers, for instructing the controlling instrumentation in accordance with preprogrammed instructions, receiving data from the detection instrumentation, and for analyzing, storing and interpreting the data, and providing the data and interpretations in a readily accessible reporting format. The controller system can also be coupled to an appropriately programmed processor or computer which functions to instruct the operation of these instruments in accordance with preprogrammed or user input instructions, receive data and information from these instruments, and interpret, manipulate and report this information to the user. As such, the computer is typically appropriately coupled to one or both of these instruments (e.g., including an analog to digital or digital to analog converter as needed).

The computer typically includes appropriate software for receiving user instructions, either in the form of user input into a set parameter fields, e.g., in a user interface, or in the form of preprogrammed instructions, e.g., preprogrammed for a variety of different specific operations. The software then converts these instructions to appropriate language for instructing the operation of the fluid direction and transport controller to carry out the desired sequential actuation of the valves. The computer may also receive the data from the one or more sensors/detectors included within the system, and interpret the data, either in a user understood format or using that data to initiate further controller instructions, in accordance with the programming, e.g., such as in monitoring and control of flow rates, temperatures, applied voltages, and the like.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A system for controlling fluid flow in a microfluidic device comprising
    a microchannel having a valve seat therein;
    a valve film overlaying the valve seat so as to block fluid flow when the film is seated directly on top of the valve seat; and
    a mechanism for deflecting the film away from the valve seat upon actuation, the mechanism comprising:
        a fluid reservoir fluidly connected to the valve film,
        an actuator film having a conductive coating thereon covering an opening of the fluid reservoir, wherein the actuator and the valve films are fluidly connected; and
        a fixed electrode opposing and separated from the conductive coating by a gap.

2. The system of claim 1, wherein the conductive coating is a continuous blanket coating or is patterned by micro-fabrication.

3. The system of claim 1, wherein the fluid reservoir is fluidly connected to the valve film by a channel.

4. The system of claim 1, wherein the fluid reservoir is placed in a different physical location than the valve film to physically separate the location of the actuator film and valve film, and fluidly connected to both the actuator film and the valve film by fluidic channels.

5. The system of claim 1, wherein inlet and outlet channels are connected to the fluid reservoir.

6. The system of claim 1, wherein the fluid reservoir is hermetically sealed.

7. The system of claim 1, wherein the area of the fluid reservoir covered by the coated film is larger than the area of the fluid reservoir that is in direct fluid contact with the first film.

8. The system of claim 1, wherein at least one of the actuator film or the valve film is made of an elastomeric polymer.

9. The system of claim 8, wherein the elastomeric polymer is selected from the group consisting of polyisoprene, polybutadiene, polychloroprene, polyisobutylene, poly(styrene-butadiene-styrene), the polyurethanes, and silicone polymers; or poly(bis(fluoroalkoxy)phosphazene), poly (carborane-siloxanes), poly(acrylonitrile-butadiene), poly(1-butene), poly(chlorotrifluoroethylene-vinylidene fluoride) copolymers, poly(ethyl vinyl ether), poly(vinylidene fluoride), poly(vinylidene fluoride-hexafluoropropylene)copolymer, elastomeric compositions of polyvinylchloride (PVC), polysulfone, polycarbonate, polymethylmethacrylate (PMMA), polytetrafluoroethylene, polydimethylsiloxane (PDMS), and blends thereof.

10. A method for controlling fluid flow in a microfluidic device comprising:
   providing a microchannel having a valve seat therein;
   providing a film overlaying the valve seat so as to block fluid flow when the film is seated directly on top of the valve seat; and
   providing a mechanism for deflecting the film away from the valve seat upon actuation, the mechanism comprising:
      a fluid reservoir fluidly connected to the valve film,
      an actuator film having a conductive coating thereon covering an opening of the fluid reservoir, wherein the actuator and the valve films are fluidly connected; and
      a fixed electrode opposing and separated from the conductive coating by a gap; and
   actuating or deactuating the mechanism to allow or to retard flow.

11. The method of claim 10, wherein the conductive coating is a continuous blanket coating or is patterned by microfabrication.

12. The method of claim 10, wherein the fluid reservoir is fluidly connected to the valve film by a channel.

13. The method of claim 10, wherein the fluid reservoir is placed in a different physical location than the valve film to physically separate the location of the actuator film and valve film, and fluidly connected to both the actuator film and the valve film by fluidic channels.

14. The method of claim 10, wherein inlet and outlet channels are connected to the fluid reservoir.

15. The method of claim 10, wherein the fluid reservoir is hermetically sealed.

16. The method of claim 10, wherein the area of the fluid reservoir covered by the coated film is larger than the area of the fluid reservoir that is in direct fluid contact with the first film.

17. The method of claim 10, wherein at least one of the actuator film or the valve film is made of an elastomeric polymer.

18. The method of claim 17, wherein the elastomeric polymer is selected from the group consisting of polyisoprene, polybutadiene, polychloroprene, polyisobutylene, poly(styrene-butadiene-styrene), the polyurethanes, and silicone polymers; or poly(bis(fluoroalkoxy)phosphazene), poly(carborane-siloxanes), poly(acrylonitrile-butadiene), poly(1-butene), poly(chlorotrifluoroethylene-vinylidene fluoride) copolymers, poly(ethyl vinyl ether), poly(vinylidene fluoride), poly(vinylidene fluoride-hexafluoropropylene)copolymer, elastomeric compositions of polyvinylchloride (PVC), polysulfone, polycarbonate, polymethylmethacrylate (PMMA), polytetrafluoroethylene, polydimethylsiloxane (PDMS), and blends thereof.

19. A method for making a microfluidic device comprising:
   providing a microchannel having a valve seat therein;
   providing a film overlaying the valve seat so as to block fluid flow when the film is seated directly on top of the valve seat; and
   providing a mechanism for deflecting the film away from the valve seat upon actuation, the mechanism comprising:
      a fluid reservoir fluidly connected to the valve film,
      an actuator film having a conductive coating thereon covering an opening of the fluid reservoir, wherein the actuator and the valve films are fluidly connected; and
      a fixed electrode opposing and separated from the conductive coating by a gap.

20. The method of claim 19, wherein the conductive coating is a continuous blanket coating or is patterned by microfabrication.

21. The method of claim 19, wherein the fluid reservoir is fluidly connected to the valve film by a channel.

22. The method of claim 19, wherein the fluid reservoir is placed in a different physical location than the valve film to physically separate the location of the actuator film and valve film, and fluidly connected to both the actuator film and the valve film by fluidic channels.

23. The method of claim 19, wherein inlet and outlet channels are connected to the fluid reservoir.

24. The method of claim 19, wherein the fluid reservoir is hermetically sealed.

25. The method of claim 19, wherein the area of the fluid reservoir covered by the coated film is larger than the area of the fluid reservoir that is in direct fluid contact with the first film.

26. The method of claim 19, wherein at least one of the actuator film or the valve film is made of an elastomeric polymer.

27. The method of claim 26, wherein the elastomeric polymer is selected from the group consisting of polyisoprene, polybutadiene, polychloroprene, polyisobutylene, poly(styrene-butadiene-styrene), the polyurethanes, and silicone polymers; or poly(bis(fluoroalkoxy)phosphazene), poly(carborane-siloxanes), poly(acrylonitrile-butadiene), poly(1-butene), poly(chlorotrifluoroethylene-vinylidene fluoride) copolymers, poly(ethyl vinyl ether), poly(vinylidene fluoride), poly(vinylidene fluoride-hexafluoropropylene)copolymer, elastomeric compositions of polyvinylchloride (PVC), polysulfone, polycarbonate, polymethylmethacrylate (PMMA), polytetrafluoroethylene, polydimethylsiloxane (PDMS), and blends thereof.

\* \* \* \* \*